United States Patent
Wanthal

(10) Patent No.: US 8,455,085 B2
(45) Date of Patent: Jun. 4, 2013

(54) METAL/COMPOSITE JOINT WITH SELECTIVE INTERLAMINAR REINFORCEMENT

(75) Inventor: Steven P. Wanthal, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 12/019,910

(22) Filed: Jan. 25, 2008

(65) Prior Publication Data

US 2009/0190997 A1 Jul. 30, 2009

(51) Int. Cl.
*B32B 3/00* (2006.01)

(52) U.S. Cl.
USPC .......................................... 428/156; 428/615

(58) Field of Classification Search
USPC .................. 403/266, 265, 268, 364; 428/156, 428/615; 52/582.1, 585.1
See application file for complete search history.

(56) References Cited

U.S. PATENT DOCUMENTS

| | | | | |
|---|---|---|---|---|
| 3,480,054 A * | 11/1969 | Marian | ........................ | 144/347 |
| 4,489,123 A * | 12/1984 | Schijve et al. | ................ | 428/213 |
| 4,808,461 A * | 2/1989 | Boyce et al. | .................. | 428/119 |
| 5,972,524 A * | 10/1999 | Childress | ...................... | 428/615 |
| 5,980,665 A * | 11/1999 | Childress | ........................ | 156/92 |
| 6,769,472 B2 * | 8/2004 | Lee | ............................... | 160/236 |
| 6,984,277 B2 * | 1/2006 | Morrison et al. | ......... | 156/89.11 |
| 7,056,576 B2 * | 6/2006 | Johnson | ..................... | 428/309.9 |
| 7,143,510 B2 * | 12/2006 | Myers et al. | ................. | 29/888.1 |
| 7,387,147 B2 * | 6/2008 | Johnson et al. | .............. | 156/433 |
| 2008/0003401 A1* | 1/2008 | Barnes et al. | .................. | 428/99 |

FOREIGN PATENT DOCUMENTS

| | | | |
|---|---|---|---|
| EP | 1707702 A2 | * | 10/2006 |
| WO | 2009094595 A1 | | 7/2009 |

OTHER PUBLICATIONS

PCT/US2009/031914, Jan. 23, 2009.

* cited by examiner

*Primary Examiner* — Daniel P. Stodola
*Assistant Examiner* — Nahid Amiri
(74) *Attorney, Agent, or Firm* — Yee & Associates, P.C.

(57) ABSTRACT

A metal/composite joint. An illustrative embodiment of the metal/composite joint includes a metallic component, a composite component provided in engagement with the metallic component, an engagement region defining contact between the metallic component and the composite component and a plurality of attachment projections joining the metallic component and the composite component. The attachment projections may be non-uniformly distributed along the engagement region. A method of joining a metallic component and a composite component is also included.

10 Claims, 3 Drawing Sheets

METAL/COMPOSITE JOINT WITH SELECTIVE INTERLAMINAR REINFORCEMENT

TECHNICAL FIELD

The disclosure relates to metal/composite joints. More particularly, the disclosure relates to a metal/composite joint having selective interlaminar reinforcement to maintain structural integrity of a composite adherend.

BACKGROUND

Bonded metal-to-composite joints may require reinforcement either within the adhesive or within the first few plies of composite material due to high interlaminar stresses. These stresses may peak at the ends of the bondline or engagement region between the composite and the metal; therefore, ply distortions of the composite may be initiated at the end of the engagement region. Local reinforcement of the engagement region may enhance the structural strength of the joint.

One current technique of reinforcing a metal-to-composite joint may include use of a complex bond design such as a step lap joint which may effectively reduce the peak stresses between the metal and composite. Another reinforcement technique may include the use of mechanical reinforcements such as fasteners. However, these reinforcement techniques may be complex and expensive to manufacture.

SUMMARY

The disclosure is generally directed to a metal/composite joint. An illustrative embodiment of the metal/composite joint includes a metallic component, a composite component provided in engagement with the metallic component, an engagement region defining contact between the metallic component and the composite component and a plurality of attachment projections joining the metallic component and the composite component. The attachment projections may be non-uniformly distributed along the engagement region. In some embodiments, distribution of the attachment projections may be limited to the area or areas of high interlaminar stress along the engagement region. In some embodiments, the attachment projections may be non-uniformly distributed along the engagement region.

The metal/composite joint may delay the onset of failure in a metal-to-composite joint by providing local Z-direction reinforcement in the area or areas where the joint is subjected to high Z-direction stresses. The design of the metal/composite joint may allow for simpler metal adherands than a step-lap-joint design and may eliminate the need for added fasteners for a mechanically-reinforced option.

The disclosure is generally further directed to a method of joining a metallic component and a composite component. An illustrative embodiment of the method includes providing a metallic component and a composite component in engagement with the metallic component; defining an engagement region between the metallic component and the composite component; forming attachment projections along the engagement region in a non-uniform distribution along the engagement region; and engaging the metallic component and the composite component along the engagement region. The attachment projections may penetrate into the composite component.

BRIEF DESCRIPTION OF THE ILLUSTRATIONS

DETAILED DESCRIPTION

The disclosure is generally directed to a metal/composite joint which may include a metal component which is attached to a composite component along an engagement region or region of contact between the components. Multiple attachment projections may extend from the metal component into the composite component at the engagement region. The distribution of attachment projections along the engagement region may be non-uniform and may be more concentrated in areas of relatively high interlaminar stress than in areas of relatively low interlaminar stress of the engagement region. This may provide Z-axis reinforcement of the attachment in the area or areas in which reinforcement is most needed while minimizing ply distortions and maximizing the structural integrity of the composite component in the remaining area or areas of the engagement region. The metal/composite joint may be suitable for aerospace applications or any other application in which fastening of a composite component to a metallic component is deemed necessary and in which the composite component may be subjected to relatively high interlaminar stresses in the engagement region between the components, particularly in the area or areas in which attachment projections extend from the metal component into the composite component.

Figure 1A:
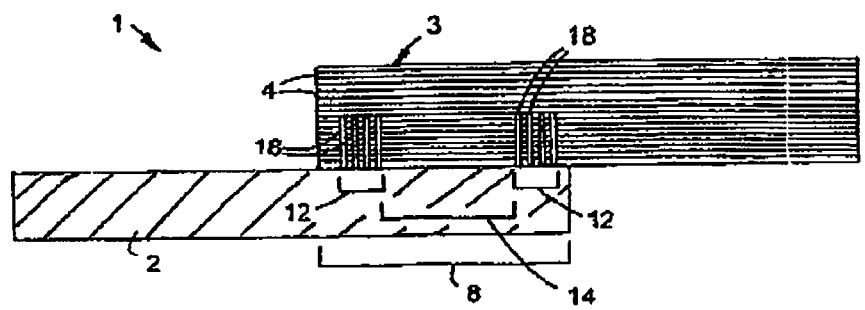
FIG. 1A is a cross-sectional view of an illustrative embodiment of the metal/composite joint with selective interlaminar reinforcement, with attachment projections U.S.S.N. 12/019,910extending from a metal component of the metal/composite joint into a composite component of the joint.
Figure 1B:
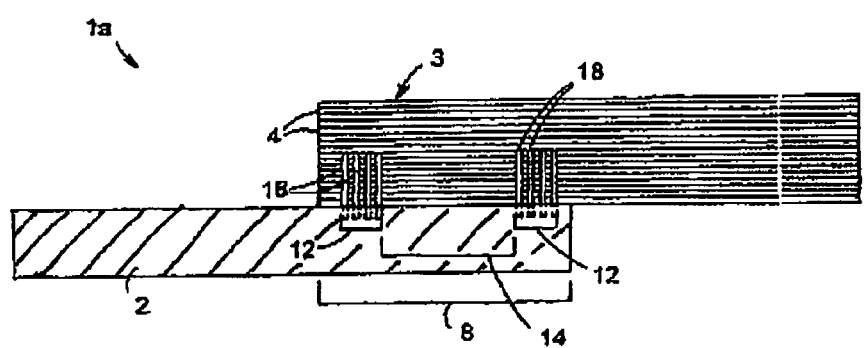
FIG. 1B is a cross-sectional view of an illustrative embodiment of the metal/composite joint with selective interlaminar reinforcement, with attachment projections extending into a metal component of the metal/composite joint.
Figure 1C:
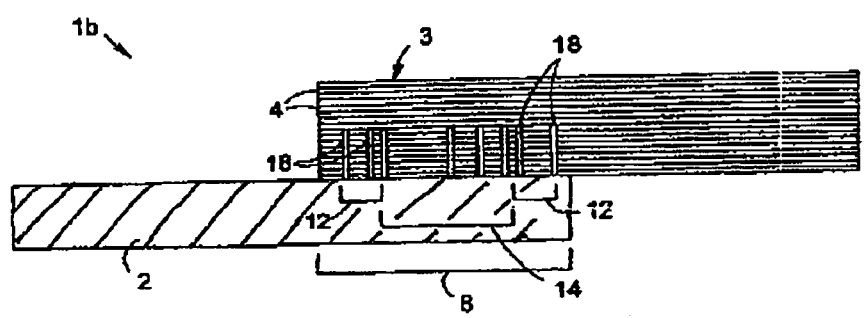
FIG. 1C is a cross-sectional view of an illustrative embodiment of the metal/composite joint with selective interlaminar reinforcement, with attachment projections distributed non-uniformly along an engagement region of a metal component with a composite component.
Figure 2:
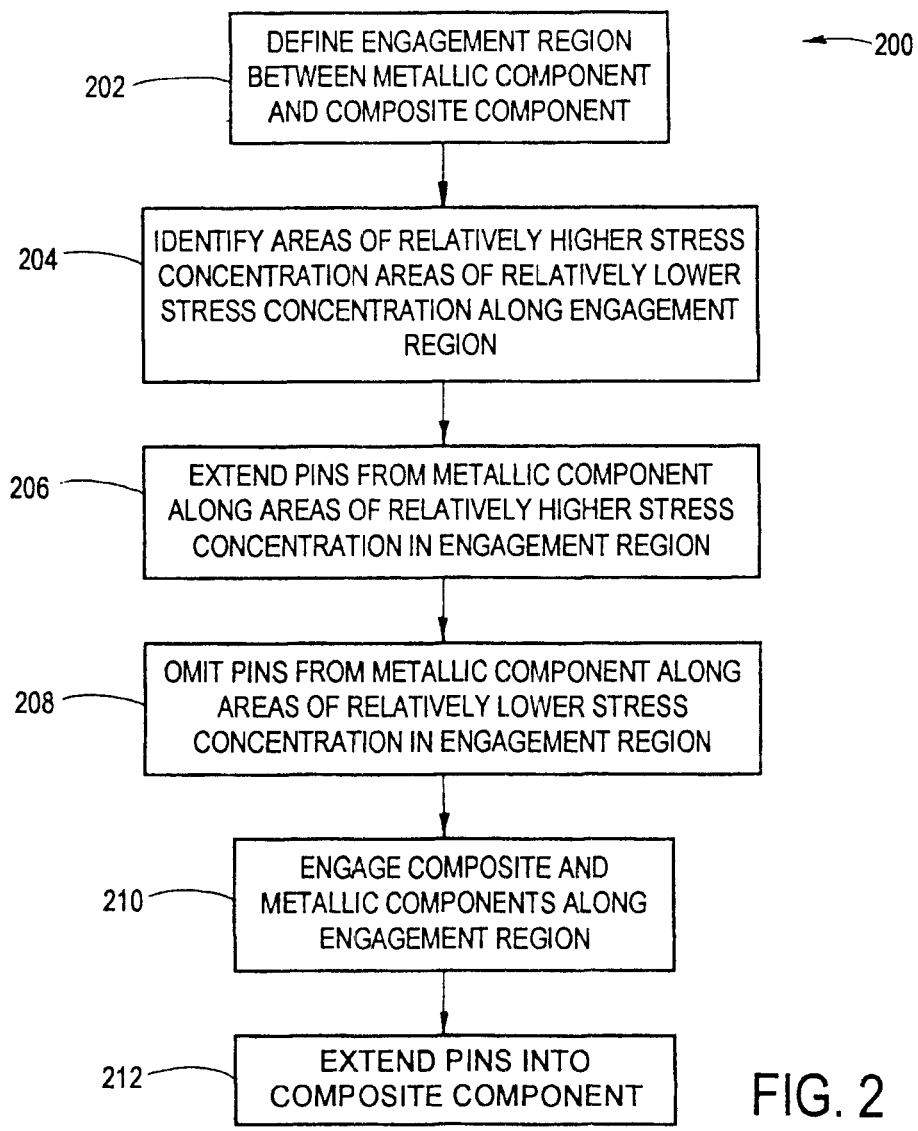
FIG. 2 is a flow diagram which illustrates an illustrative method of joining a metallic component and a composite component.
Figure 3:
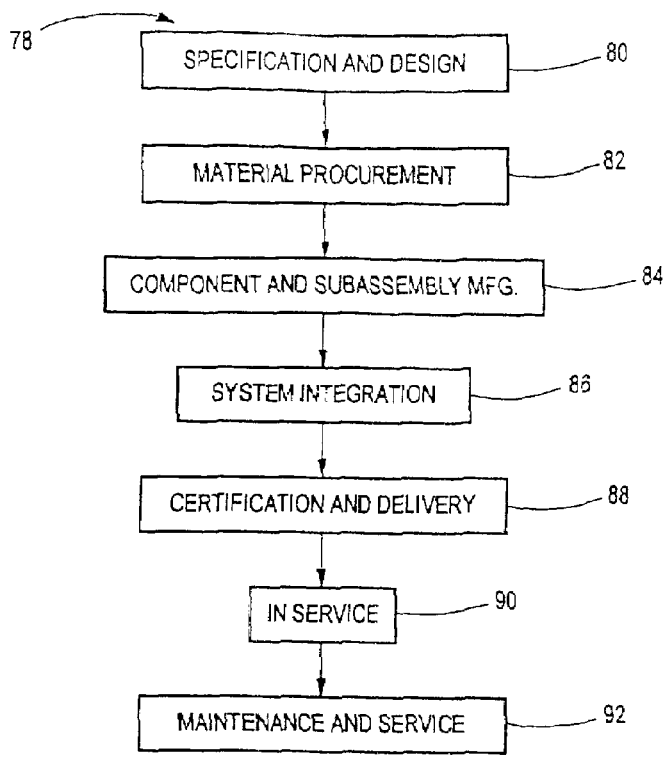
FIG. 3 is a flow diagram of an aircraft production and service methodology.

Referring initially to FIGS. 1-3, an illustrative embodiment of the metal/composite joint with selective interlaminar reinforcement, hereinafter joint, is generally indicated by reference numeral 1. The joint 1 joins a metal component 2 to a composite component 3. The metal component 2 may be titanium, for example and without limitation. The composite component 3 may include multiple laminated composite plies 4.

At the joint 1, the metal component 2 may engage the composite component 3 along an engagement region 8. The engagement region 8 may be coextensive with the area of contact between the metal component 2 and the composite component 3. The areas of interlaminar stress along the engagement region 8 may vary in magnitude depending on the structural forces which are exerted on the joint 1. In some applications, areas of relatively high interlaminar stress 12 may be concentrated at or near the respective end portions of the engagement region 8. An area of relatively low interlaminar stress 14 may extend along the engagement region 8 between the areas of high interlaminar stress 12. However, the number and locations of the area or areas of relatively high interlaminar stress 12 and the area or areas of relatively low interlaminar stress 14 along the engagement region 8 may vary depending on the particular application of the joint 1.

As shown in FIG. 1A, multiple attachment projections 18 may extend from the metal component 2 and into the composite component 3. As shown in FIG. 1B, in some embodiments of the joint 1a, the attachment projections 18 may extend into the metal component 2, as indicated in phantom. The attachment projections 18 may be the same metal as or a different metal than the metal component 2. The distribution of the attachment projections 18 may be non-uniform across the engagement region 8. As shown in FIG. 1A, the concentration of the attachment projections 18 may be greater at each of the areas of relatively high interlaminar stress 12 relative to the areas of relatively low interlaminar stress 14 of the engagement region 8. As shown in FIG. 1A, in some applications the areas of relatively high interlaminar stress 12 are generally located at or near the respective ends of the engagement region 8; therefore, the attachment projections 18 are concentrated at or near the respective ends of the engagement region 8 and are absent or less numerous or concentrated in the area of relatively low interlaminar stress 14 which extends between the areas of relatively high interlaminar stress 12. However, the location or locations of the area or areas of relatively high interlaminar stress 12 and the area or areas of relatively low interlaminar stress 14 and therefore, the concentration or distribution of the attachment projections 18 along the engagement region 8, may vary depending on the particular application of the metal/composite joint 1. The distribution of the attachment projections 18 along the engagement region 8 may be based on an optimization. As shown in FIG. 1C, in some embodiments of the joint 1b, the attachment projections 18 may be distributed non-uniformly along the engagement region 8.

In typical application of the metal/composite joint 1, interlaminar stresses may be applied to the composite component 1. The magnitude of the interlaminar stresses may be greater at the area or areas of relatively high interlaminar stress 12 than at the area or areas of relatively low interlaminar stress 14 along the engagement region 8. Therefore, the relatively higher concentration of the attachment projections 18 at the area or areas of relatively high interlaminar stress 12 may provide Z-axis reinforcement or enhance the strength of attachment of the composite component 3 to the metal component 2, preventing or at least minimizing initial peeling of the composite plies 4 of the composite component 3 in the area or areas of relatively high interlaminar stress 12. This may prevent or at least minimize peeling of the composite plies 4 along the engagement region 8. The absence or relatively lower concentration of the attachment projections 18 at the area or areas of relatively low interlaminar stress 14 may minimize ply distortions and maintain the structural integrity of the composite component 3 at the area or areas of relatively low interlaminar stress 14.

Referring next to FIG. 2, a flow diagram 200 which illustrates an illustrative method of joining a metallic component and a composite component is shown. In block 202, an engagement region between a metallic component and a composite component which are to be joined may be defined. In block 204, areas of relatively higher interlaminar stress concentration and areas of relatively lower interlaminar stress concentration along the engagement region may be identified. In block 206, attachment projections may be extended from the metallic component along the area or areas of relatively higher interlaminar stress concentration in the engagement region. In block 208, the attachment projections may be omitted from the metallic component along the area or areas of relatively lower stress concentration in the engagement region. The distribution of the attachment projections along the engagement region may be based on an optimization. In block 210, the composite and metallic components may be engaged along the engagement region. In block 212, the attachment projections may be extended into the composite component.

Figure 4:
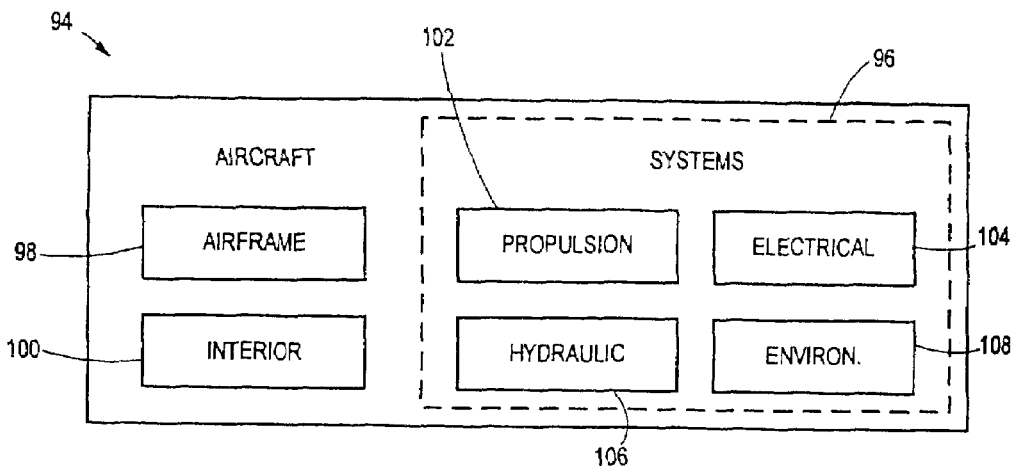
FIG. 4 is a block diagram of an aircraft.

Referring next to FIGS. 3 and 4, embodiments of the disclosure may be used in the context of an aircraft manufacturing and service method 78 as shown in FIG. 3 and an aircraft 94 as shown in FIG. 4. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 4, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of creating a joint between a metallic component and a composite component, the method comprising:
   identifying a first area wherein stresses normal to the composite component are above a predetermined threshold that would initiate delamination of the composite component;
   identifying a second area wherein stresses normal to the composite component are lower than the stresses in the first area;
   forming attachment projections on the metallic component to form a distribution, the distribution comprising a first number of attachment projections in the first area wherein the first number of attachment projections maintains structural integrity of the composite component within the first area and a second number of attachment projections in the second area wherein the second number of attachment projections in the second area maintains structural integrity of the composite component within the second area, wherein the first area has a higher concentration of attachment projections than the second area; and engaging the composite component and the metallic component by extending the attachment projections from the metallic component into the composite component, the attachment projections penetrating into and not through the composite component, to form the joint.

2. The method of claim 1 wherein the distribution is further configured to minimize peeling of the composite component due to interlaminar stress.

3. The method of claim 1
wherein the first area and the second area are within an engagement region, wherein the engagement region comprises a region in which the metallic component contacts the composite component and the attachment projections join the metallic component and the composite component.

4. The method of claim 3 wherein the first area is located at an end of the engagement region.

5. The method of claim 4 wherein the second area is in a center of the engagement region.

6. The method of claim 3, wherein the distribution comprises a greater number of attachment projections within the first area than in the second area.

7. The method of claim 3, wherein the distribution is non-uniform across the first area.

8. The method of claim 3, wherein the distribution is non-uniform across the second area.

9. The method of claim 1 wherein the metallic component comprises a titanium component.

10. The method of claim 1, wherein the distribution is non-uniform across an engagement region, wherein the engagement region comprises a region in which the metallic component contacts the composite component and the attachment projections join the metallic component and the composite component.

* * * * *